United States Patent
Lopez De Arroyabe et al.

(10) Patent No.: US 11,552,375 B2
(45) Date of Patent: Jan. 10, 2023

(54) ENERGY STORAGE MODULE, ENERGY STORAGE SYSTEM, VEHICLE AND METHOD FOR MEASURING A CELL VOLTAGE

(71) Applicant: Bayerische Motoren Werke Aktiengesellschaft, Munich (DE)

(72) Inventors: Jose Lopez De Arroyabe, Munich (DE); Jan Philipp Schmidt, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 615 days.

(21) Appl. No.: 16/539,604

(22) Filed: Aug. 13, 2019

(65) Prior Publication Data

US 2019/0372081 A1    Dec. 5, 2019

Related U.S. Application Data

(63) Continuation of application No. PCT/EP2017/082834, filed on Dec. 14, 2017.

(30) Foreign Application Priority Data

Feb. 14, 2017  (DE) ...................... 10 2017 202 359.7

(51) Int. Cl.
*H01M 50/54*     (2021.01)
*H01M 10/625*    (2014.01)
(Continued)

(52) U.S. Cl.
CPC ............. *H01M 50/54* (2021.01); *B60L 50/64* (2019.02); *B60L 50/66* (2019.02);
(Continued)

(58) Field of Classification Search
CPC .. H01M 50/54; H01M 10/625; H01M 10/657; B60L 50/64
See application file for complete search history.

(56) References Cited

U.S. PATENT DOCUMENTS

| | | | |
|---|---|---|---|
| 8,472,164 B2 | 6/2013 | Kim | |
| 2004/0038123 A1* | 2/2004 | Hisamitsu | ......... H01M 10/0413 |
| | | | 429/61 |
| 2004/0126655 A1 | 7/2004 | Hisamitsu et al. | |

FOREIGN PATENT DOCUMENTS

| | | |
|---|---|---|
| DE | 603 14 825 T2 | 3/2008 |
| DE | 10 2013 020 942 A1 | 6/2015 |

(Continued)

OTHER PUBLICATIONS

PCT/EP2017/082834, International Search Report dated Apr. 10, 2018 (Five (5) pages).

(Continued)

*Primary Examiner* — Tae-Sik Kang
(74) *Attorney, Agent, or Firm* — Crowell & Moring LLP

(57) ABSTRACT

An energy storage module, particularly a solid state battery, an energy storage system, a vehicle and a method for measuring an electrical voltage on an energy storage module or on an energy storage system is based on two stacked and series-connected energy storage cells, each have an anode layer and a cathode layer. A contact, which is electrically connected to an anode layer located within the stack of a first energy storage cell and to a cathode layer located within the stack of a second energy storage cell, which is adjacent to the first energy storage cell, leads out of the stack such that at least one contact can be contacted from outside the stack.

11 Claims, 8 Drawing Sheets

(51) Int. Cl.
  *H01M 10/657* (2014.01)
  *B60L 50/64* (2019.01)
  *B60L 50/60* (2019.01)
  *H01M 10/04* (2006.01)
  *H01M 10/42* (2006.01)
  *H01M 10/48* (2006.01)

(52) U.S. Cl.
  CPC ... *H01M 10/0418* (2013.01); *H01M 10/4257* (2013.01); *H01M 10/625* (2015.04); *H01M 10/657* (2015.04); *H01M 10/482* (2013.01); *H01M 2010/4271* (2013.01)

(56) References Cited

FOREIGN PATENT DOCUMENTS

| | | |
|---|---|---|
| EP | 2 017 918 A1 | 1/2009 |
| JP | 2004-63397 A | 2/2004 |
| JP | 2007-12584 A | 1/2007 |
| KR | 10-2016-0067565 A | 6/2016 |
| WO | WO 2017/007827 A1 | 1/2017 |

OTHER PUBLICATIONS

German Search Report issued in German counterpart application No. 10 2017 202 359.7 dated Nov. 17, 2017, with Statement of Relevancy (Eight (8) pages).

* cited by examiner

ENERGY STORAGE MODULE, ENERGY STORAGE SYSTEM, VEHICLE AND METHOD FOR MEASURING A CELL VOLTAGE

CROSS REFERENCE TO RELATED APPLICATIONS

This application is a continuation of PCT International Application No. PCT/EP2017/082834, filed Dec. 14, 2017, which claims priority under 35 U.S.C. § 119 from German Patent Application No. 10 2017 202 359.7, filed Feb. 14, 2017, the entire disclosures of which are herein expressly incorporated by reference.

BACKGROUND AND SUMMARY OF THE INVENTION

The invention relates to an energy storage module, in particular a solid-state battery, for the electrochemical storage of energy, to an energy storage system comprising such energy storage modules, to a vehicle comprising such an energy storage module or energy storage system, and to a method for measuring an electrical voltage at such an energy storage module or energy storage system.

Solid-state batteries are electrochemical energy storage cells in which solid electrolytes are used instead of liquid electrolytes. The use of solid electrolytes results in significantly higher energy densities being achieved in comparison with liquid electrolytes. Furthermore, as a result, the production of such cells is simplified and the safety thereof during operation is increased. In order to increase the achievable voltages, a plurality of energy storage cells are generally connected in series.

It is an object of the invention to enable a further increase in the reliability of an energy storage module during operation and in particular to achieve a longer lifetime in conjunction with high energy density.

An energy storage module according to the invention, in particular in the form of a solid-state battery, for the electrochemical storage of energy comprises at least two energy storage cells arranged in a stack and connected in series and each having an anode layer and a cathode layer, and is characterized by at least one contact element which is electrically connected to an anode layer of a first energy storage cell, said anode layer being located within the stack, and to a cathode layer of a second energy storage cell adjacent to the first energy storage cell, said cathode layer being located within the stack, and is led out from the stack such that the at least one contact element is electrically contactable from outside the stack.

A first energy storage system according to the invention comprises at least two energy storage modules according to the invention, wherein the energy storage modules are arranged next to one another and/or one above another in such a way that at least one contact element led out from a first energy storage module and at least one contact element led out from a second energy storage module adjacent to the first energy storage module touch one another.

A second energy storage system according to the invention comprises a plurality of energy storage modules, wherein contact lugs of different energy storage modules that correspond to one another with regard to the construction of the energy storage modules are arranged in such a way that these lie in a respective line, in particular in the stacking direction.

A plurality within the meaning of the invention refers to at least two, preferably three, more preferably several, items or objects.

A vehicle, in particular a motor vehicle, according to the invention comprises an energy storage module according to the invention and/or an energy storage system according to the invention. The vehicle preferably comprises an electric drive or a hybrid drive.

A first method according to the invention for measuring an electrical voltage at an energy storage module and/or energy storage system according to the invention, comprising at least two contact elements, between which one or a plurality of energy storage cells are arranged, is characterized in that an electrical voltage at in each case two contact elements led out from a stack of energy storage cells connected in series is tapped off and measured.

A second method according to the invention for measuring an electrical voltage at a plurality of energy storage modules and/or an energy storage system comprises contact lugs, wherein the contact lugs that lie in a line, in particular in the stacking direction, are electrically connected and form in each case a first parallel circuit, wherein a plurality of these first parallel circuits extend parallel to one another in each case, and an electrical voltage at the contact lugs is tapped off and measured.

One aspect of the invention is based on the approach that the electrochemical energy storage cells form a so-called bipolar stack, in which the anode and cathode layers of adjacent energy storage cells are electrically connected to one another by an electrically conductive contact element, wherein the contact element is led out from the stack in order to make it accessible outside the stack. As a result, the respective potential, in particular the individual cell voltage (also referred to hereinafter as "individual cell voltage"), of the individual cells connected in series can easily be tapped off and measured in order to obtain therefrom for example information about the individual state of charge of the individual energy storage cells.

By virtue of the measurement or monitoring—made possible as a result—of the individual cell voltages of the cells connected in series in the bipolar stack, an imminent overcharging and/or deep discharge of the individual cells during charging and/or discharging of the energy storage module can be detected in a timely manner in order to initiate in a timely manner the countermeasures respectively required for avoiding damage to individual cells. By way of example, if necessary, e.g. in the case of an imminent overcharging or deep discharge of individual cells, the state of charge of individual energy storage cells can be influenced by charges externally fed in or carried away via the contact elements, for instance by an electrical current source or an electrical load being applied or connected to two respective contact elements, in particular one contact element connected to the cathode and one to the anode of an individual cell.

Overall, the invention enables a further increase in the reliability of an energy storage module during operation. As a result, it is possible to achieve longer lifetimes in conjunction with high energy density.

In one preferred embodiment, the at least one contact element has an electrically conductive contact layer extending substantially parallel to the respective anode layer and cathode layer, said contact layer being electrically connected to the anode layer and the cathode layer. In this case, the contact layer forms an electrically conductive intermediate wall or layer which is arranged between respectively adjacent cells and by which the anode and cathode layers of the adjacent cells are connected to one another. The contact layer, which can also be referred to as a bipolar plate or as a current collecting layer, preferably extends over the entire cross section of the stack. The area of the contact layer thus forms the conductor cross section for the operating current that flows in the stacking direction.

Preferably, the at least one contact element is led out from the stack at a side surface of the stack in order to enable contacting from outside in a particularly simple manner. In this case, the side surface of the stack extends substantially parallel to a stacking direction in which the energy storage cells, in particular the anode and cathode layers, are stacked one above another or arranged next to one another in the stack, and/or perpendicular to the anode and cathode layers.

In one preferred embodiment, the at least one contact element has a contact pad extending substantially parallel along a side surface of the stack, said contact pad being electrically contactable from outside the stack. The at least one contact element can be contacted particularly reliably via such a contact pad.

Preferably, the contact pad is spaced apart from the side surface of the stack, for example by a contact lug of the contact element, said contact lug projecting from the stack laterally, i.e. perpendicular to the stacking direction. Alternatively or additionally, the contact pad is electrically insulated from the side surface, in particular from one or more anode and/or cathode layers, of the stack. In both cases, a short circuit is avoided in a simple manner.

In a further preferred embodiment, the contact pad, along the side surface of the stack, in particular in the stacking direction and/or perpendicular to the contact layer, has an extent that is greater than the thickness of the contact layer. Preferably, the contact pad extends along the side surface of the stack, in particular in the stacking direction, over more than 100 µm, preferably more than 250 µm, particularly preferably more than 500 µm. The risk of incorrect contacting, in particular the contacting of an anode or cathode layer or the generation of an electrical short circuit, is reduced as a result.

In a further preferred embodiment, the contact pad is configured to form a plug connection with a contact pad of another energy storage module and/or an electrical line. Preferably, for this purpose, the contact pad has a first plugging or latching element, which can be connected to a corresponding second plugging or latching element of a contact pad of another energy storage module and/or an electrical line in such a way that an electrical connection is produced. This allows electrical interconnection with other energy storage modules in a fast, simple and reliable manner.

In a further preferred embodiment, a plurality of contact elements each having a contact pad are led out from the side surface of the stack, wherein the respective contact pads are arranged offset in two dimensions of the side surface, such that different contact pads have different positions not only in the stacking direction but also perpendicular to the stacking direction. Preferably, in this case, the offset of two adjacent contact pads perpendicular to the stacking direction is greater than the extent of the contact pads perpendicular to the stacking direction. By virtue of the arrangement offset perpendicular to the stacking direction, the extent of the individual contact pads in the stacking direction can be chosen to be large enough to enable safe and simple electrical contacting—without the risk of touching and/or overlap with an adjacent contact pad.

In a further preferred embodiment, the contact pads of the contact elements are arranged substantially along a diagonal of the side surface of the stack. As a result, a regular arrangement of the contact pads is achieved, in particular with a maximum possible distance between the contact pads perpendicular to the stacking direction. This makes the contacting particularly safe and simple. Moreover, if two such energy storage modules are placed against one another by their side surfaces, then the respective contact pads of the energy storage modules come into contact, wherein the latter can be interconnected with one another to form an energy storage system in a simple and reliable manner.

In a further preferred embodiment of the energy storage module, the contact element has a contact lug extending away from a side surface of the stack. What is achieved as a result is that the contact element and thus also its voltage value can be tapped off and measured in order to prevent the contact element from touching a component of the stack, leading to a short circuit, for example.

In a further preferred embodiment of the energy storage module, the contact pad is spaced apart from the side surface and is electrically connected to the contact element by means of the contact lug. This makes it possible that tapping off the voltage at the contact element can be carried out in a simplified manner. In particular, the distance between the contact lug and the stack at least substantially prevents a tapping tool from inadvertently making contact with the stack.

In a further preferred embodiment of the energy storage module, the contact lug is formed integrally with the contact pad. What can be achieved as a result is that the electrical connection between the contact element and the contact pad via the contact lug and the mechanical strength of this are improved.

In a further preferred embodiment of the energy storage module, the contact pad is located at least partly in a plane that is at least substantially parallel to a side surface. By virtue of this embodiment, the voltage of the contact element can be tapped off via the contact pad, independently of the form of a tapping tool.

In a further preferred embodiment of the energy storage module, a plurality of contact elements are led out from at least a first and a second side surface of the stack, said second side surface being located in particular opposite the first side surface, in each case by means of at least one contact lug and the respective contact lugs, in particular their contact pads, are arranged offset in two dimensions of the side surface. What can be achieved as a result is that in the case of a plurality of energy storage cells arranged within a stack, an inadvertent contacting or a short circuit of two adjacent contact elements that are led out from the stack as contact lugs is avoided since the distribution of these contact lugs is shared between at least two side surfaces. In particular, provision can be made for in each case the contact lugs of energy storage cells of a first group, which are arranged at an odd location, namely for example at the first, third, fifth location, of the stack, to be arranged at a first side surface and contact lugs of energy storage cells of a second group, which are arranged at an even location, namely for example at the second, fourth, sixth location, of the stack, to be arranged at a side surface that is different, in particular located opposite, with respect to the first side surface.

In a further preferred embodiment of the energy storage module, the contact lugs are arranged substantially along a diagonal of the side surface of the stack. What can be achieved as a result is that a geometric arrangement of the contact lugs out of the stack is ensured, as a result of which a tapping tool can better tap the contact lugs, in particular the contact pads thereof, since the contact lugs are thus arranged at predetermined points.

In a further preferred embodiment of the energy storage module, the energy storage module comprises an electronic control device, which is arranged on an end face of the stack and is electrically connected to the contact lugs. What can be achieved by this embodiment is that the cell voltage of the individual energy storage cells can be determined by means of the control device. Furthermore, the arrangement of the control device at an end face of the stack reduces the risk of the control device inadvertently making contact with an electrically conductive component of the stack.

In a further preferred embodiment of the energy storage module, the contact lugs that are electrically connected to the topmost and bottommost contact elements, in particular with respect to the stacking direction, have an increased area and/or thickness and/or length and/or are arranged at a third and fourth side surface different than the first and second side surfaces. Said contact elements are preferably those contact elements which carry the highest current flow into the stack and out of the latter again. On account of this property, said contact elements are embodied such that said contact elements can carry higher current flows without the risk of destruction of the contact elements.

In one preferred embodiment of the second energy storage system, contact lugs that lie in a line, in particular in the stacking direction, are electrically connected and form in each case a first parallel circuit, wherein a plurality of these first parallel circuits extend parallel to one another in each case. What can be achieved by means of these first parallel circuits is that the contact lugs of all the energy storage cells do not have to be tapped individually, but rather are tappable in combination as a plurality of first parallel circuits.

In a further preferred embodiment of the second energy storage system, the energy storage system comprises an electronic control device, which is arranged on an end face of a stack of the plurality of energy storage modules and is electrically connected to the contact lugs, in particular to the first parallel circuits. This control device makes it possible to monitor and control all the energy storage cells, such that possible deviations of cell voltages are able to be determined by the control device. Furthermore, the arrangement of the control device on the end face of the stack allows a reduction of the risk of the control device unintentionally coming into contact with an electrically conductive component of the stack.

In a further preferred embodiment of the second energy storage system, a temperature-regulating device is arranged at least between each second, in particular between each, energy storage module, said temperature-regulating device extending substantially parallel to the contact elements of the energy storage modules, in particular in a meandering fashion. Said temperature-regulating device can make it possible that the energy storage modules can be operated at an optimized operating temperature. In particular, this heat exchange achieves the effect that the energy storage modules can be either heated or cooled to a predetermined operating temperature.

In a further preferred embodiment of the second energy storage system, respective first terminals of a plurality of temperature-regulating devices and respective second terminals of a plurality of temperature-regulating devices are electrically connected to one another and are led out from the stack, such that the first and second terminals form in each case a second parallel circuit, wherein a plurality of these second parallel circuits in each case extend parallel to one another. What can be achieved as a result is that not every temperature-regulating device need be connected individually to a respective separate line to its first and second terminals. Secondly, a space-saving and simple line placement can be made possible by means of this parallel routing of the second parallel circuits.

In a further preferred embodiment of the second energy storage system, the first and the second electrical parallel circuits extend at least substantially parallel to one another. What can be achieved by the parallel routing of the first and second electrical parallel circuits is that the construction of the energy storage system is simplified since the lines of the first and second parallel circuits are able to be placed in a space-saving and efficient manner.

In a further preferred embodiment of the second energy storage system, the control device is electrically connected to the first and second terminals of the plurality of temperature-regulating devices in order to control the first and second terminals of the plurality of temperature-regulating devices and/or to supply said terminals with electrical energy. What can be achieved as a result is that the temperature-regulating devices do not require additional terminals involving the risk of inadvertent contacting with an electrically conductive component of the stack. What can furthermore be achieved is that the entire energy storage system is controllable by means of the control device and hence a single component.

In a further preferred embodiment of the first method for measuring an electrical voltage at an energy storage module and/or an energy storage system, the electrical voltage at in each case two contact elements which is respectively connected to the anode layer and the cathode layer of an energy storage cell and is led out from the stack is tapped off and measured. As a result, the cell voltage of an individual energy storage cell in a stack having a plurality of energy storage cells can be detected reliably and the operating state, in particular state of charge, of the individual energy storage cell can be determined as a result. Alternatively, as a result, an electrical voltage of a plurality of energy storage cells in a plurality of stacks which are connected in parallel in an energy storage system can also be detected, without a measurement at a plurality of individual energy storage cells being necessary.

In one preferred configuration of the second method, a voltage deviation of at least one first parallel circuit of the plurality of first parallel circuits from a predetermined voltage value is determined and on the basis of the voltage deviation the energy storage cells, in particular their voltage value, are controlled which are electrically connected to the first parallel circuit, preferably by passive and/or active charge balancing between the energy storage cells which are electrically connected to the first parallel circuit and energy storage cells of a further first parallel circuit.

What can be achieved as a result is that a plurality of energy storage cells of a plurality of energy storage modules can be simultaneously tapped and monitored, thereby making it possible overall to save structural space and additional electronics. Furthermore, the lifetime and the efficiency of the energy storage cells, preferably of the energy storage module, more preferably of the entire energy storage system, can thus also be increased in a simple manner.

In a further preferred configuration of the second method, first terminals of a plurality of temperature-regulating devices and second terminals of a plurality of temperature-regulating devices which are arranged at least between each second, in particular between each, energy storage module and which extend substantially parallel to the contact elements of the energy storage modules, in particular in a meandering fashion, are in each case electrically connected to one another and are led out from the respective stack of the energy storage modules and the first and second terminals of the plurality of temperature-regulating devices are controlled and/or supplied with electrical energy.

What can be achieved as a result is that firstly the energy storage modules can rapidly be brought to an optimized operating temperature. Secondly, this method makes it possible that overall only two lines need to be placed for the first and second terminals of the plurality of temperature-regulating devices.

Further features, advantages and application possibilities of the invention will become apparent from the following description in association with the figures, in which:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
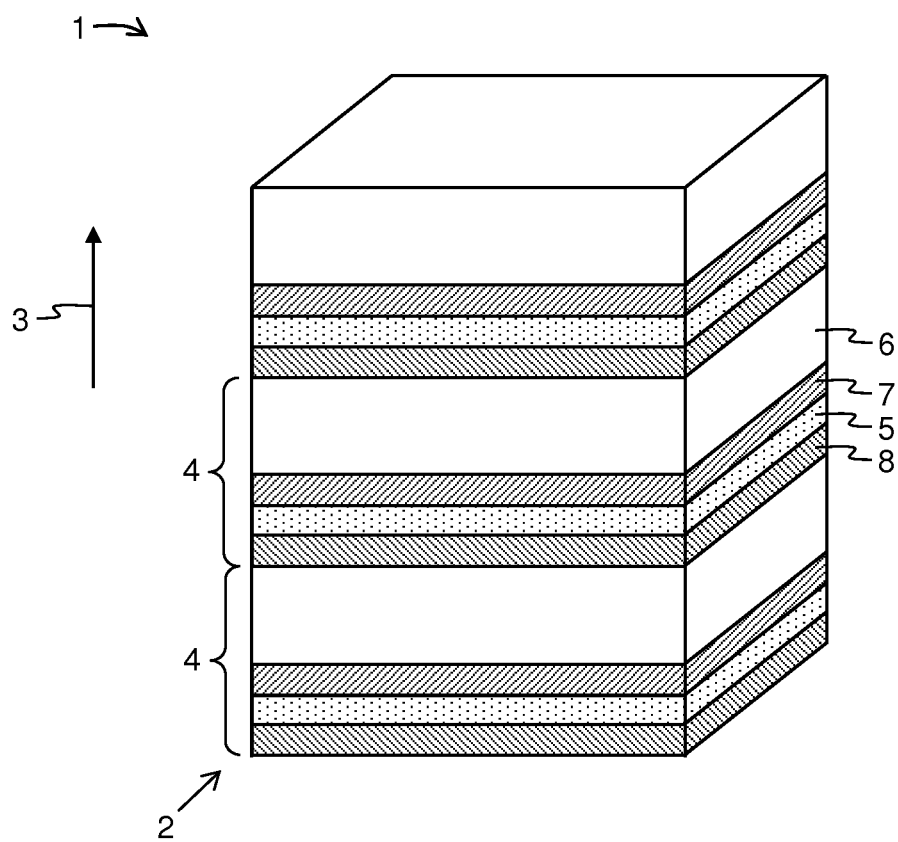
FIG. 1 shows a first example of an energy storage module.

FIG. 1 shows a first example of an energy storage module 1 comprising three energy storage cells 4 stacked one above another in a stacking direction 3. Each of the energy storage cells 4 has an anode layer 5, embodied for example as a thin film, and also a cathode layer 6, in each case a solid electrolyte 7 being situated between said layers. The anode layers 5 are preferably embodied as lithium anodes. The cathode layers 6 are preferably embodied as composite cathodes.

The energy storage cells 4 connected in series in this way form a so-called bipolar stack 2.

Furthermore, electrically conductive contact elements 8 are provided, which are embodied as contact layers and in each case are arranged between an anode and cathode layer 5, 6 of two adjacent energy storage cells 4 and are electrically connected thereto. The contact elements 8 are preferably embodied as thin layers, the layer thickness of which in the stacking direction 3 is preferably less than 100 µm. On account of the electrically conductive connection to the respective anode and cathode layers 5, 6, the contact elements 8 are at the electrical potential of the respective anode or cathode layer 5, 6.

The contact elements 8 are led out from the stack 2 and are configured to be contacted from outside the stack 2, in particular in order to tap off and measure the electrical voltage of an individual energy storage cell 4 at two contact elements 8 bearing against the cathode layer 6 (at the top in the stacking direction 3 in the example) and anode layer 5 (at the bottom in the stacking direction 3 in the example) of the energy storage cell 4. As a result, it is possible, despite series connection in the form of a bipolar stack 2, to tap off and monitor the voltages of the individual energy storage cells 4 in order if necessary—for example in the case of an imminent deep discharge or overcharging of an individual cell 4—to be able to implement the required countermeasures in a timely manner.

By contrast, the measurement of the total voltage of the stack 2 by contacting the topmost cathode layer 6 and the bottommost anode layer 5 of the stack 2 would be significantly less meaningful with regard to imminent damage to an individual cell 4, with the result that damage to the individual cell 4—and consequently to the entire module 1—would not be able to be reliably avoided.

Figure 2:
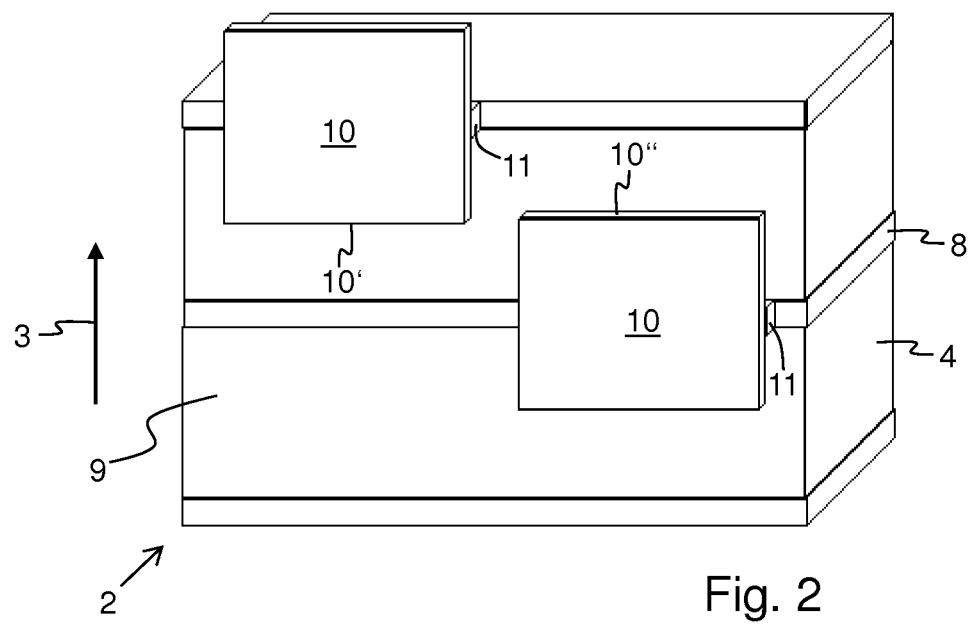
FIG. 2 shows a second example of an energy storage module.

FIG. 2 shows an excerpt from a second example of an energy storage module, wherein the contact elements 8 are each provided with a contact pad 10 extending substantially parallel to a side surface 9 of the stack 2 or perpendicular to the anode and cathode layers of the stack 2. Via the contact pads 10, the contact layers of the contact elements 8 situated between the individual cells can be contacted particularly reliably and safely from outside.

In the example illustrated, the contact pads 10 are embodied in a plate-shaped fashion and have a thickness that preferably corresponds approximately to the thickness of the contact layer of the contact elements 8. Alternatively, however, the thickness of the contact pads 10 can also be chosen to be greater than the layer thickness of the contact elements 8 in order to increase further the mechanical stability of the contact pads 10.

The contact pads 10 have in the stacking direction 3 an extent that is greater than the thickness of the contact layer of the contact elements 8, such that the contact pads 10, in the stacking direction 3, project beyond the respective contact layer of the contact elements 8 and, as illustrated by way of example, project over part of the respectively adjacent energy storage cells 4 in the region of the side surface 9 of the stack 2.

In the example illustrated, the extent of the contact pads 10 in the stacking direction 3 is slightly greater than the extent of the energy storage cells 4 in the stacking direction 3, such that the contact pads 10 project in each case approximately as far as the center of the adjacent energy storage cell 4. The lower edge 10' of an upper contact pad 10 then lies approximately at the level of the upper edge 10" of an adjacent lower contact pad 10.

In principle, however, the extent of the contact pads 10 in the stacking direction 3 can be significantly greater than, for example approximately double the magnitude of, the extent of the energy storage cells 4 in the stacking direction 3. The lower edge 10' of an upper contact pad 10 would then lie beneath the upper edge 10" of an adjacent lower contact pad 10 (not illustrated).

In order to avoid overlapping and/or electrical contacting of two adjacent contact pads 10 in a simple and reliable manner, the contact pads 10, as shown in the example, are preferably arranged offset perpendicular to the stacking direction 3.

As a result of the described dimensioning of the contact pads 10, on the one hand, and the offset arrangement on the other hand, a simple and reliable contacting of the contact pads 10 is made possible without the risk of short circuits of the contact pads 10 among one another being increased.

In the example illustrated, the contact elements 8 furthermore each have a conductor lug 11, by means of which the contact elements 8 are led out from the stack 2 at the side surface 9 and are connected to a respective contact pad 10.

The conductor lugs 11 ensure that the contact pads 10 are spaced apart at a predefined distance from the side surface 9 of the stack 2, thereby preventing a short circuit between elements of the energy storage cells 4 and/or adjacent energy storage cells 4. In particular, the contact lug 11, which can also be referred to as conductor lug 11, extends away from the side surface 9, wherein the contact element 8 has said contact lug 11. Furthermore, the contact pads 10 are electrically connected to the contact element 8 by means of the contact lugs 11. In particular, provision can be made for the contact lugs 11 to be formed integrally with the contact pads 10. As can be discerned in this illustration, the contact pads 10 are located at least partly in a plane that is at least substantially parallel to the side surface 9.

Even though the contact pads 10 are fitted only to one side surface 9 of the stack 2 in the example illustrated, it is possible or it may be advantageous to fit them to two or several side surfaces of the stack 2 in order to enable electrical contacting from outside, in particular by means of contact pads of one or more other stacks (not illustrated). By way of example, for the purpose of connecting in parallel a plurality of stacks 2 constructed in an identical manner, the contact pads 10 can be provided at both opposite side surfaces 9 of the respective stack 2. This is explained in greater detail below with reference to FIG. 3.

Figure 3:
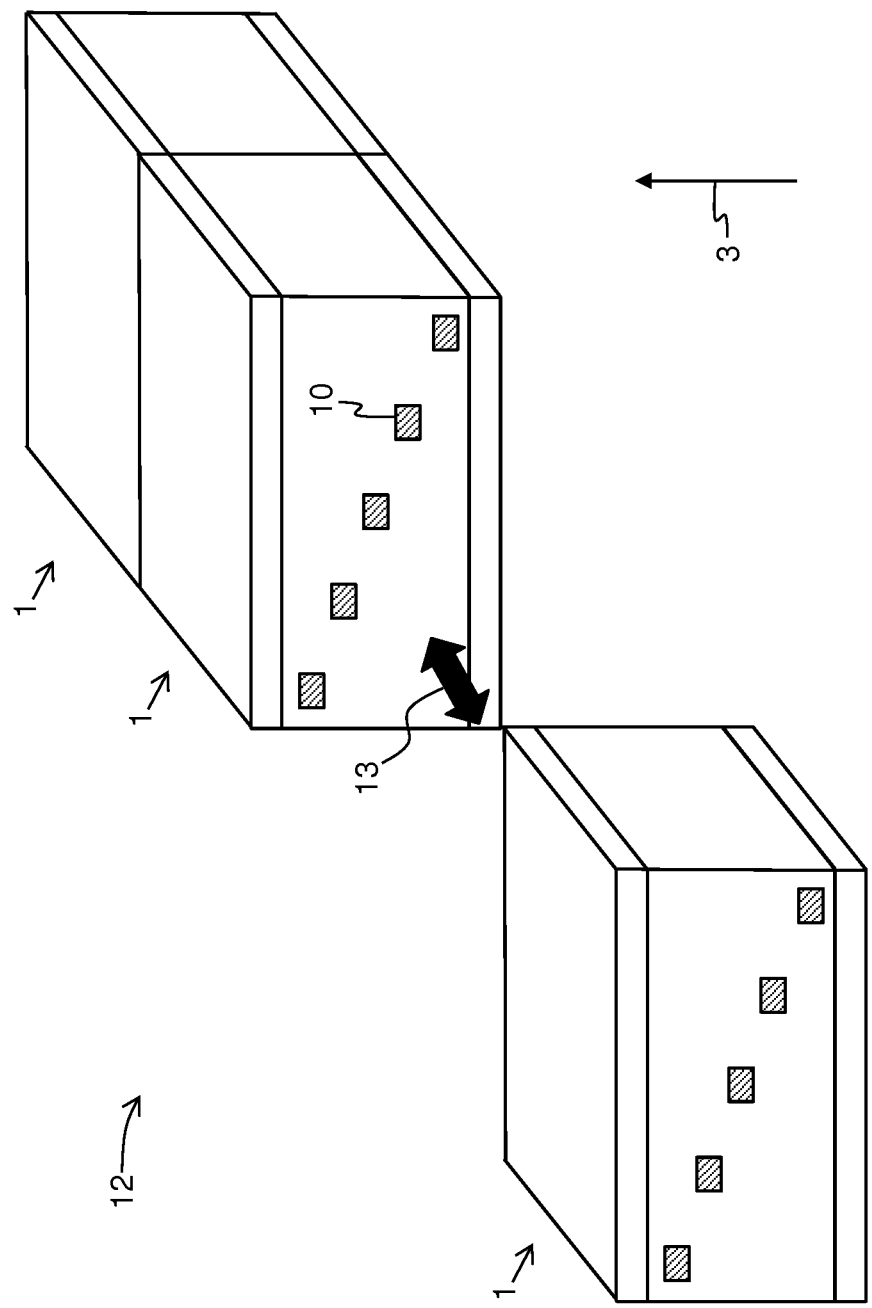
FIG. 3 shows one example for the interconnection of energy storage modules to form an energy storage system.

FIG. 3 shows one example for the interconnection of energy storage modules 1. In the illustrated example, two energy storage modules 1 bearing against one another by their respective side surfaces are interconnected in parallel and form an energy storage system 12.

As is illustrated with the aid of an additional energy storage module 1, the energy storage modules 1 are configured and/or arranged for this purpose such that the contact pads 10 arranged offset perpendicular to the stacking direction 3 at the side surfaces of adjacent energy storage modules 1 are located opposite one another and are brought into electrical contact with one another when the energy storage modules 1 are joined together, indicated by the arrow 13.

As a result, charge balancing between two or several adjacent energy storage cells 4 (see FIGS. 1 and 2) of different energy storage modules 1 is made possible since the electrodes of energy storage cells of the energy storage system 12 are conductively connected via the contact pads 10 or contact elements 8 (see FIGS. 1 and 2) in such a way that they form in each case an effective electrode of the energy storage system 12.

The electrical cell voltage of all the energy storage cells located next to one another in a plane perpendicular to the stacking direction 3 is thus identical and can easily be led out from the energy storage system 12 laterally, i.e. perpendicular to the stacking direction 3, via two contact pads 10 that are adjacent in the stacking direction 3, and be measured. As a result, the outlay for monitoring for example the state of charge of the energy storage cells or the energy storage system 12 is independent of their number of energy storage modules 1 connected in parallel.

Figure 4:
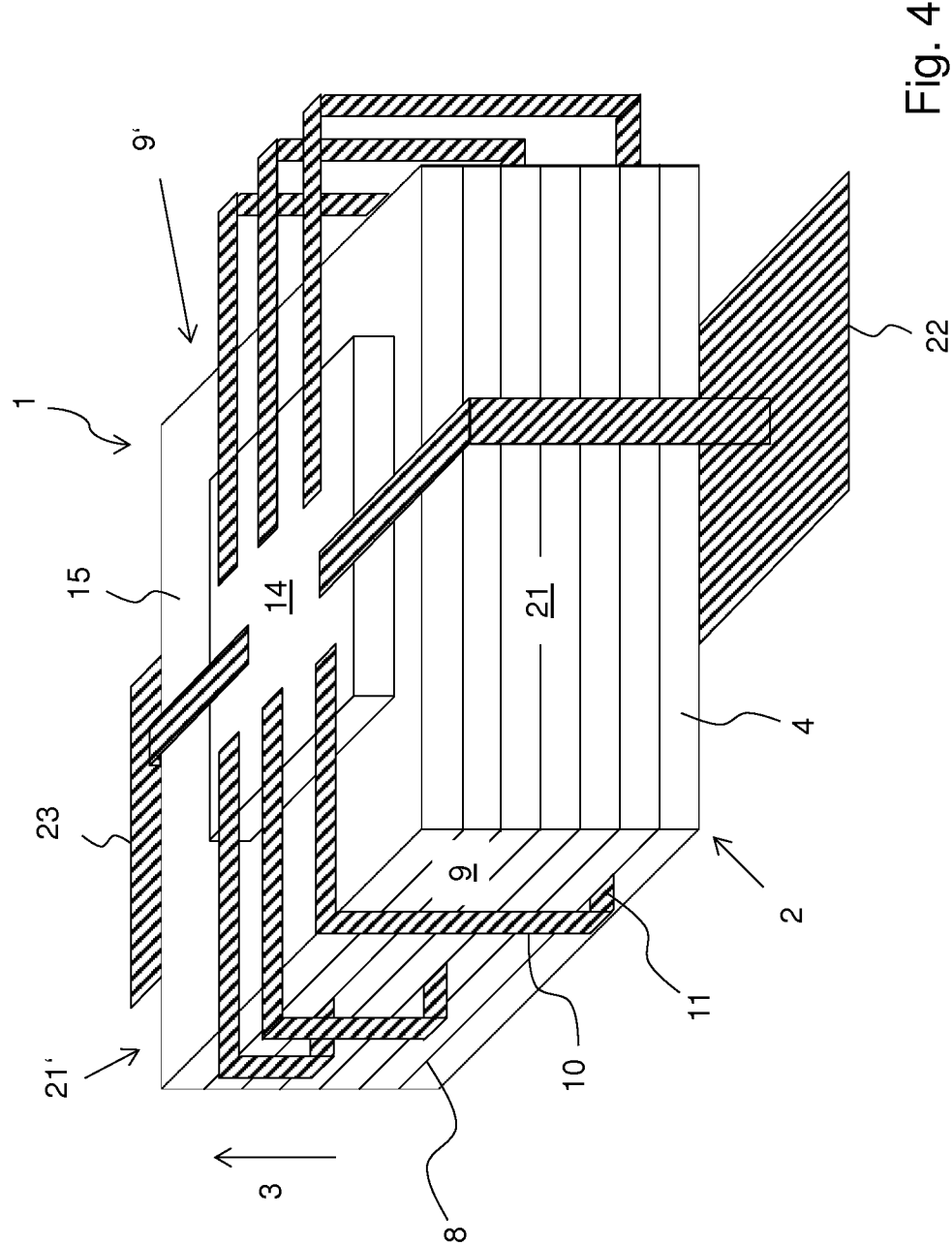
FIG. 4 shows a third example of an energy storage module.

FIG. 4 shows a third example of an energy storage module 1. In this illustration, the stack 2 has seven energy storage cells 4, wherein a contact element 8 is arranged between each energy storage cell 4. A more detailed arrangement, for example of the cathode layer 6 or the anode layer 5, has been dispensed with for the sake of improved clarity.

The contact elements 8 are spaced apart toward the outside electrically with a respective associated contact lug 11, wherein the contact lugs 11 are electrically connected to a control device 14 via a respective contact pad 10. Furthermore, the contact lugs 11 are arranged at a total of four side surfaces 9, 9', 21, 21' of the stack 2, wherein those contact lugs 11 of contact elements 8 which are arranged between two energy storage cells 4 are arranged at a first side surface 9 and a side surface 9' located opposite the first side surface.

On the left-hand side surface 9 of the stack 2, those contact elements 8 which are arranged between the first and second, the third and fourth, and the fifth and sixth, energy storage cells 4, in particular in the stacking direction 3, are led out by means of the contact lugs 11. On the right-hand side surface 9' of the stack 2, those contact elements 8 which are arranged between the second and third, the fourth and fifth, and the sixth and seventh, energy storage cells 4, in particular in the stacking direction 3, are led out by means of the contact lugs 11. Preferably, on the third side surface 21, that contact element 8 which is arranged upstream of the first energy storage cell 4, in particular in the stacking direction 3, is led out by means of the first contact lug for current collectors 22. With further preference, on the fourth side surface 21', that contact element 8 which is arranged downstream of the seventh energy storage cell 4, in particular in the stacking direction 3, is led out by means of the second contact lug for current collectors 23. In this case, all the contact lugs 11 and the first contact lug for current collectors 22 and the second contact lug for current collectors 23 are integrally connected to a respective contact pad 10, wherein the contact pads 10 are folded down to the upper end face 15, such that they are electrically connected to the control device 14.

What can be achieved with this arrangement is that the risk of inadvertent contacting of two contact lugs 11 is reduced, preferably prevented. By virtue of the alternating arrangement of the contact lugs 11 between the left-hand and right-hand side surfaces 9, 9', the distance between two contact lugs 11 on a side surface 9, 9' can be additionally increased. This effect is reinforced by the contact lugs 11 on a side surface 9, 9' being arranged offset in two dimensions of the side surface 9, 9'. Furthermore, the contact lugs 11 are arranged substantially along a diagonal of the side surface 9, 9' of the stack 2.

The contact lug or first contact lug for current collectors 22 of the contact element 8 which is connected, in particular in the stacking direction 3, toward the lower end face 15 and thus only to the first energy storage cell 4 is arranged at the front side surface 21. A second contact lug for current collectors 23 of the contact element 8 which is connected, in particular in the stacking direction 3, toward the upper end face 15 and thus only to the last, seventh energy storage cell 4 is arranged at the rear side surface 21', not visible in this illustration. Since the, in particular highest, electric currents are applied to these two contact lugs for current collectors 22, 23 during the operation of the energy storage module 1, these two contact lugs for current collectors 22, 23 preferably have an increased area, an increased thickness and/or an increased length.

By means of the control device 14, which is preferably arranged on the end face 15, the cell voltage of each energy storage cell 4 is able to be determined since the contact elements 8 are electrically connected to the control device 14 by means of the respective contact pads 10. Simple monitoring of the entire energy storage module 1 is thus made possible in order to determine any voltage differences or deviations of the cell voltages from a predetermined voltage value. In the event of a determined deviation of the cell voltages, it is possible to carry out for example active or passive charge balancing between that energy storage cell 4 for which a deviation of the cell voltage from a desired voltage was determined and a further energy storage cell 4.

Figure 5:
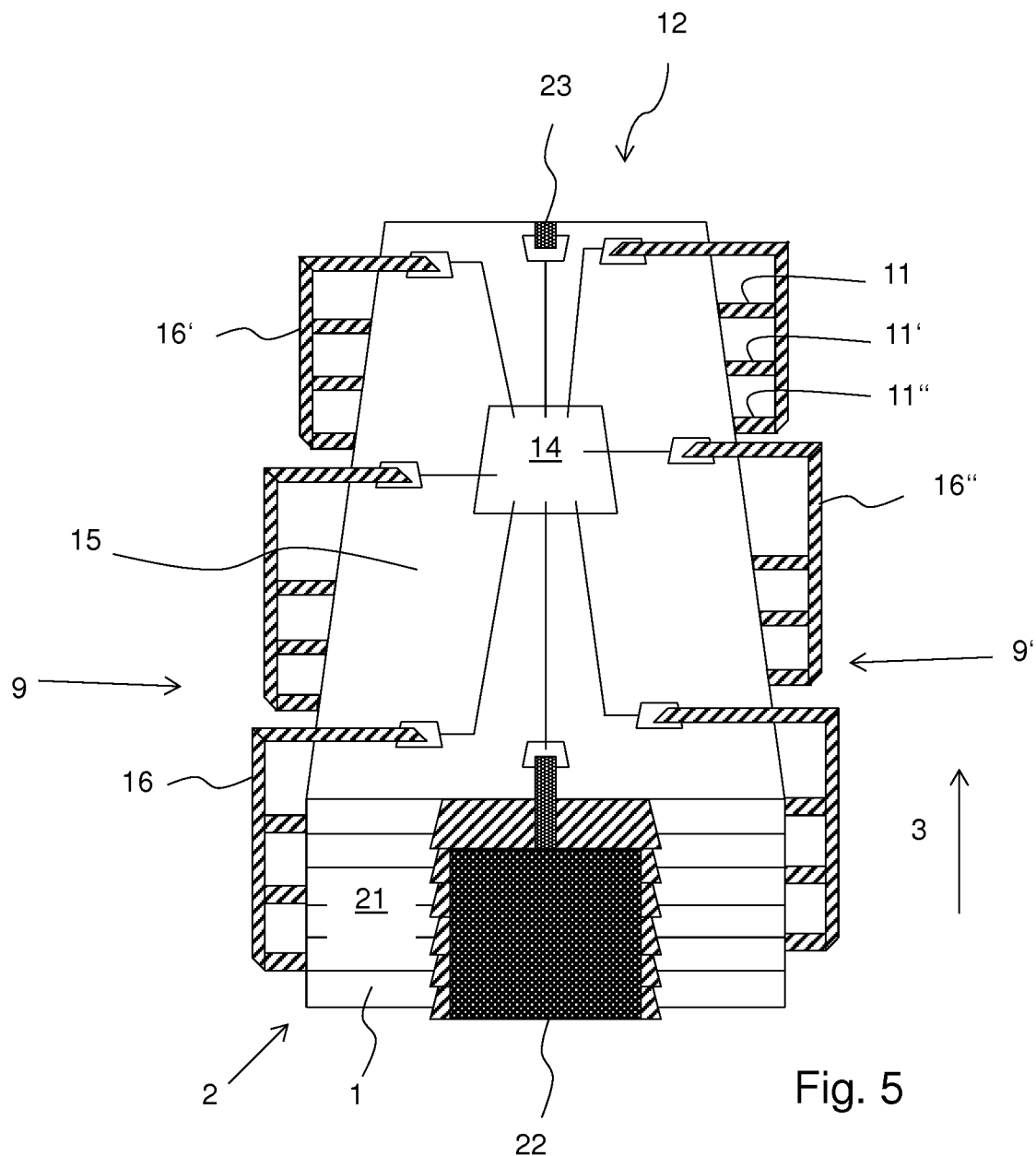
FIG. 5 shows a first example of an energy storage system.

FIG. 5 shows a first example of an energy storage system 12. In this illustration, a plurality of energy storage modules 1 are arranged one above another. A more detailed illustration of the energy storage modules 1 has been dispensed with for the sake of improved clarity.

The energy storage system 12 has a multiplicity of contact lugs 11, 11', 11", which are led out at the side surfaces 9, 9'. Furthermore, those contact lugs 11, 11', 11" of different energy storage modules 1 which correspond to one another with regard to the construction of the energy storage modules 1 are arranged in such a way that these lie in a respective line, in particular in the stacking direction 3. Said contact lugs 11, 11', 11" are in each case electrically connected by means of a respective first parallel circuit 16, 16', 16", wherein these first parallel circuits 16, 16', 16" extend parallel to one another.

Those contact lugs for current collectors 22, 23 which are arranged respectively at the topmost and at the bottommost contact element 8, in particular with respect to the stacking direction 3, of an energy storage module 1 are preferably arranged respectively at a third and at a fourth side surface 21, 21', said fourth side surface being located opposite the third side surface.

A control device 14 is arranged on the upper end face 15 of the energy storage system 12, said control device being electrically connected to the first parallel circuits 16, 16', 16".

What can be achieved by means of the first parallel circuits 16, 16', 16" is that all the contact elements 8 of the energy storage modules 1 which are arranged at the same position in the construction of the energy storage modules 1 are electrically connectable to the control device 14 via just one line by means of a respective first parallel circuit 16, 16', 16" of said contact elements 8. What can be achieved as a result is that a plurality of energy storage modules 1 can be simultaneously monitored and controlled by just one control device 14. This reduces in particular the structural space and electronics required for monitoring and control.

According to the invention, the control device 14 taps off the parallel-connected voltage values of the respective first parallel circuits 16, 16', 16", in particular the contact lugs 11, 11', 11" thereof, and on the basis of a desired voltage value, which preferably represents a voltage value of at least one parallel-connected group of energy storage cells 4, determines a possible deviation of voltage values of further parallel-connected groups of energy storage cells 4. If a voltage deviation of energy storage cells 4 of a first parallel circuit 16 is determined, suitable measures can then be taken by means of the control device 14 in order at least substantially to match the cell voltage in each energy storage cell 4 within the energy storage system 12.

This is preferably made possible by passive and/or active charge balancing between the energy storage cells 4 which are electrically connected to the first parallel circuit 16 and energy storage cells 4 of a further first parallel circuit 16', 16". By way of example, the passive charge balancing can involve a resistor and a switch, in particular a MOS field effect transistor and/or bipolar transistor. Active charge balancing is preferably carried out by means of a DC-DC converter.

By means of matching all the cell voltages, overall the efficiency of the energy storage system 12 is increased. Furthermore, the lifetime and the efficiency of each individual energy storage cell 4, preferably of the entire energy storage module 1, with further preference of the entire energy storage system 12, is increased and improved, respectively.

Figure 6:
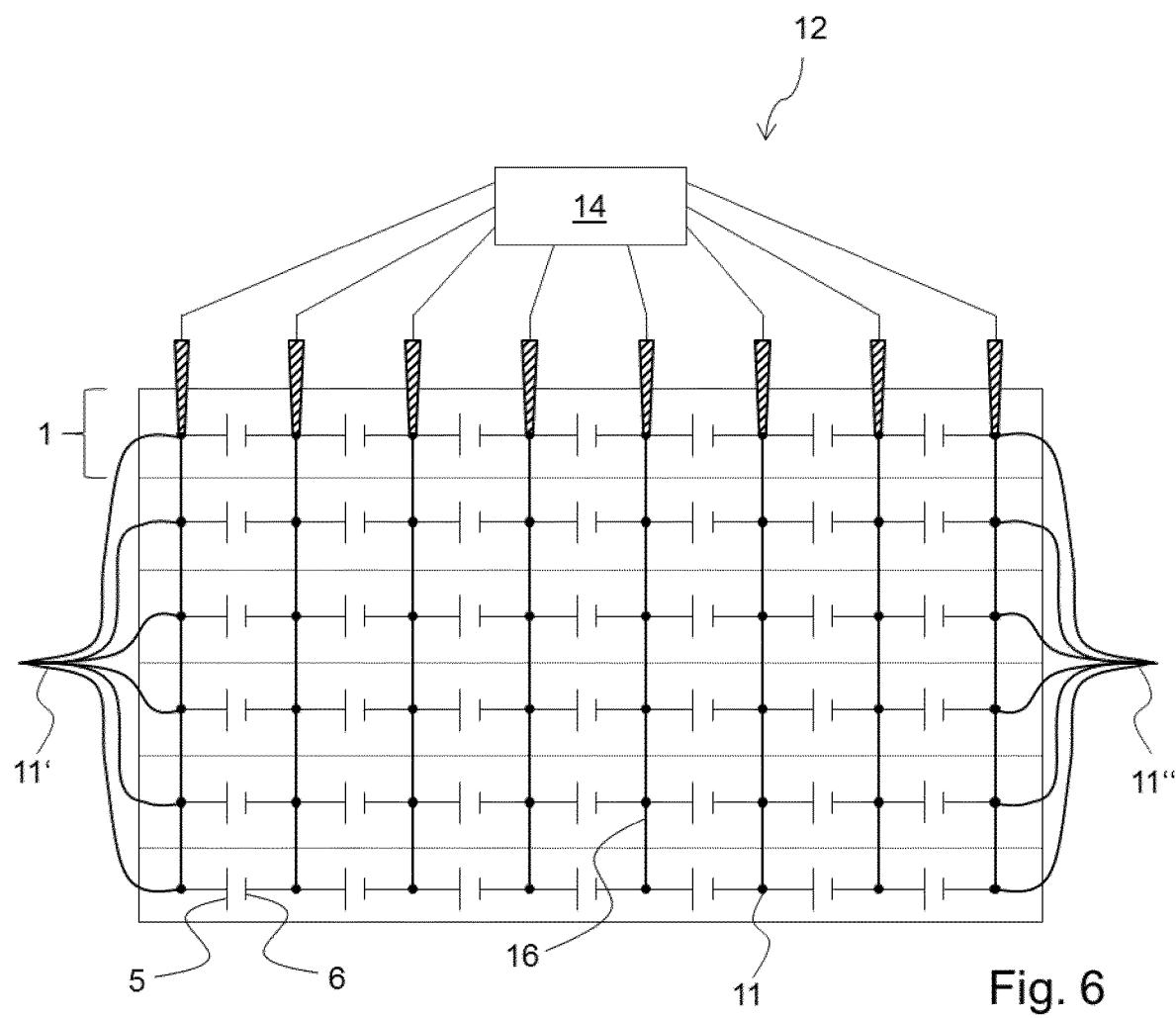
FIG. 6 shows one exemplary electrical interconnection of an energy storage system.

FIG. 6 shows one exemplary electrical interconnection of an energy storage system 12. In this two-dimensional illustration, a plurality of energy storage modules 1 are arranged one above another. A more detailed illustration of the energy storage modules 1 has been dispensed with for the sake of improved clarity.

The anode layers 5 and cathode layers 6 form an energy storage cell 4, which is illustrated here in each case using the symbol of a battery cell. The energy storage cells 4 of each energy storage module 1 or the anode layer 5 of a first energy storage cell 4 and the cathode layer 6 of a second energy storage cells 4 adjacent to the first energy storage cell 4, which have at least substantially the same electrical potential, are led out from the energy storage module 1 via contact elements 8 and thus also contact lugs 11 and are interconnected by means of a respective first parallel circuit 16. These first parallel circuits 16, 16', 16" are connected to the control device 14, such that the latter can determine possible potential differences within the energy storage modules 1.

Figure 7:
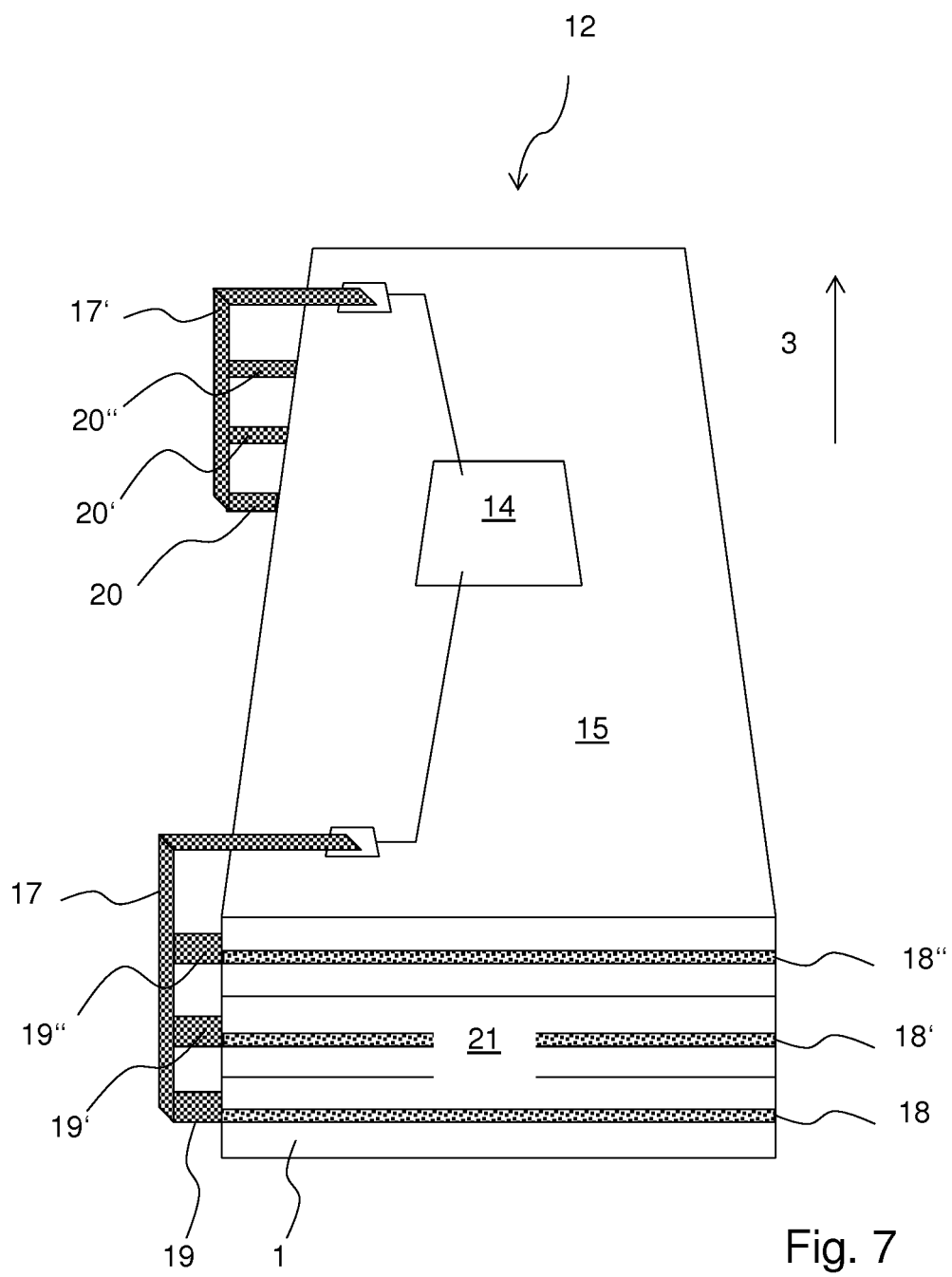
FIG. 7 shows a second example of an energy storage system.

FIG. 7 shows a second example of an energy storage system 12. In this illustration, a plurality of energy storage modules 1 are arranged one above another, wherein a temperature-regulating device 18, 18', 18" is arranged between each second energy storage module 1. A more detailed illustration of the energy storage modules 1 has been dispensed with for the sake of improved clarity.

Here in each case the first terminals 19, 19', 19" and the second terminals 20, 20', 20" of the temperature-regulating devices 18, 18', 18" are interconnected to form second parallel circuits 17, 17'. As a result, the wiring of the temperature-regulating devices 18, 18', 18" can be significantly simplified and it is possible to ensure an electrical supply by the control device 14 situated on the end face 15 of the energy storage system 12. Furthermore, the control device 14 can control, preferably switch on and/or off, the second parallel circuits 17, 17'. In one preferred exemplary embodiment, not illustrated, the control device 14 can control the temperature-regulating devices 18, 18', 18" in each case individually and/or independently of one another, in particular the temperature thereof. The control device 14 is preferably arranged on a circuit board or a substrate. With further preference, the control device 14 is embodied as a PCB, in particular as an FPGA or as a "system on a chip" (SoC).

Figure 8:
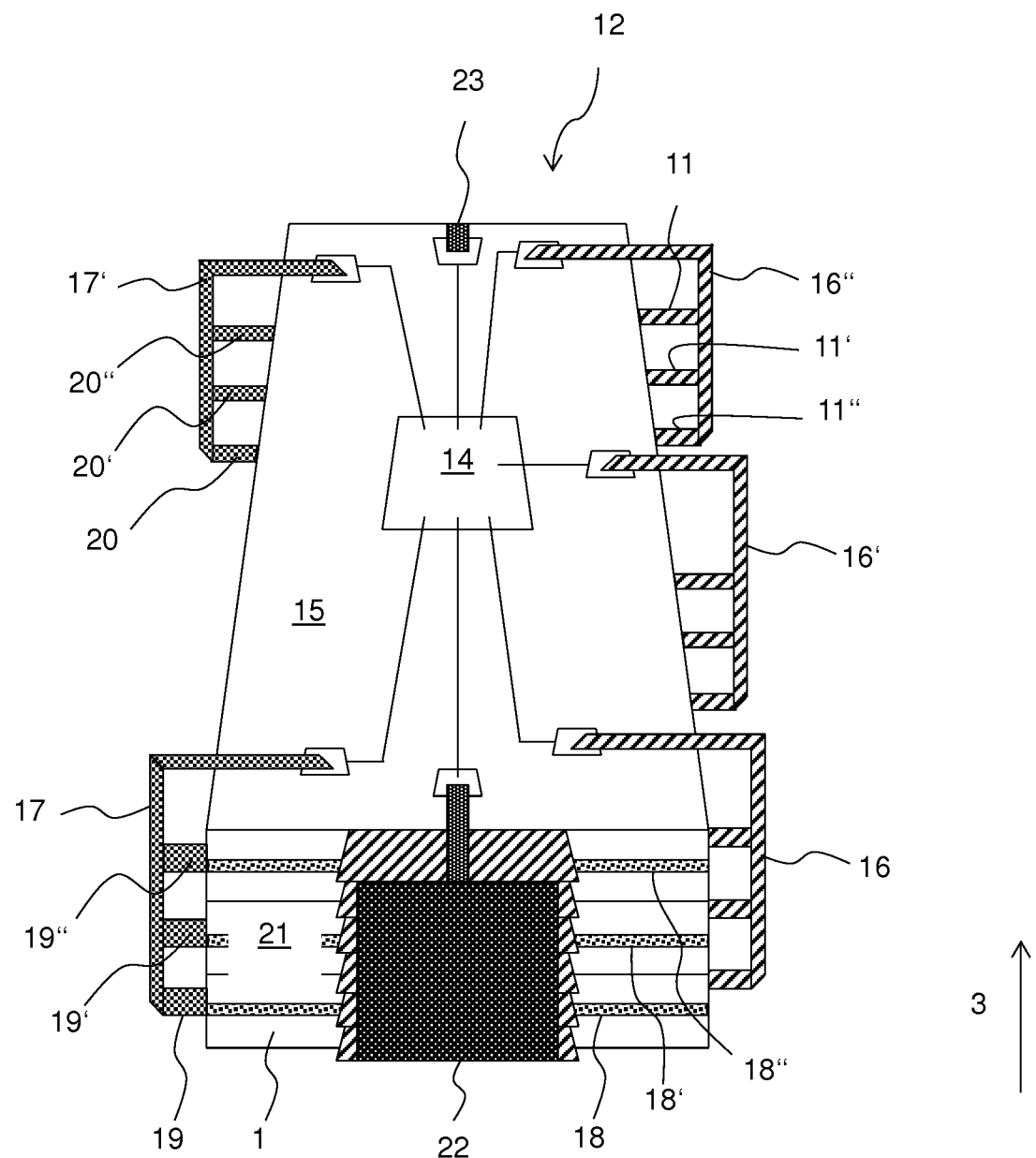
FIG. 8 shows a third example of an energy storage system.

FIG. 8 shows a third example of an energy storage system 12, which substantially constitutes a combination of the first and second examples of an energy storage system 12. In this illustration, a plurality of energy storage modules 1 are arranged one above another, wherein a temperature-regulating device 18, 18', 18" is arranged between each second energy storage module 1. A more detailed illustration of the energy storage modules 1 has been dispensed with for the sake of improved clarity.

In this case, on the left-hand side surface 9 of the energy storage system 12, the first terminals 19, 19', 19" and second terminals 20, 20', 20" of the temperature-regulating devices 18, 18', 18" are electrically connected to one another to form second parallel circuits 17, 17'. Those contact lugs 11, 11', 11", of different energy storage modules 1 that correspond to one another with regard to the construction of the energy storage modules 1 are arranged in such a way that these lie in a respective line, in particular in the stacking direction 3. All the contact lugs 11 that lie on a line are electrically connected to one another to form first parallel circuits 16, 16', 16". This separation of the first and second parallel circuits 16, 16', 16", 17, 17' makes it possible to reduce the probability of inadvertent contacting between the first parallel circuits 16, 16', 16" and the second parallel circuits 17, 17'.

In one exemplary embodiment, the end face 15 of the energy storage system 12 can be embodied partly or else wholly as a printed circuit board that is electrically connected to the control device 14. Simple contact-connection of the contact lugs 11, 11', 11" or the first parallel circuits 16, 16', 16" and the second parallel circuits 17, 17' to the control device 14 can thus be effected by means of conductor tracks of the end face 15 embodied as a printed circuit board. Furthermore, the end face 15 can be embodied as a pressure plate in order to apply a predetermined mechanical pressure to the individual anode and cathode layers 5, 6 of the energy storage cells 4 and thus overall the energy storage modules 1 during operation. The efficiency of the energy storage modules 1 or of the energy storage system 12 can be increased as a result.

Figure 9:
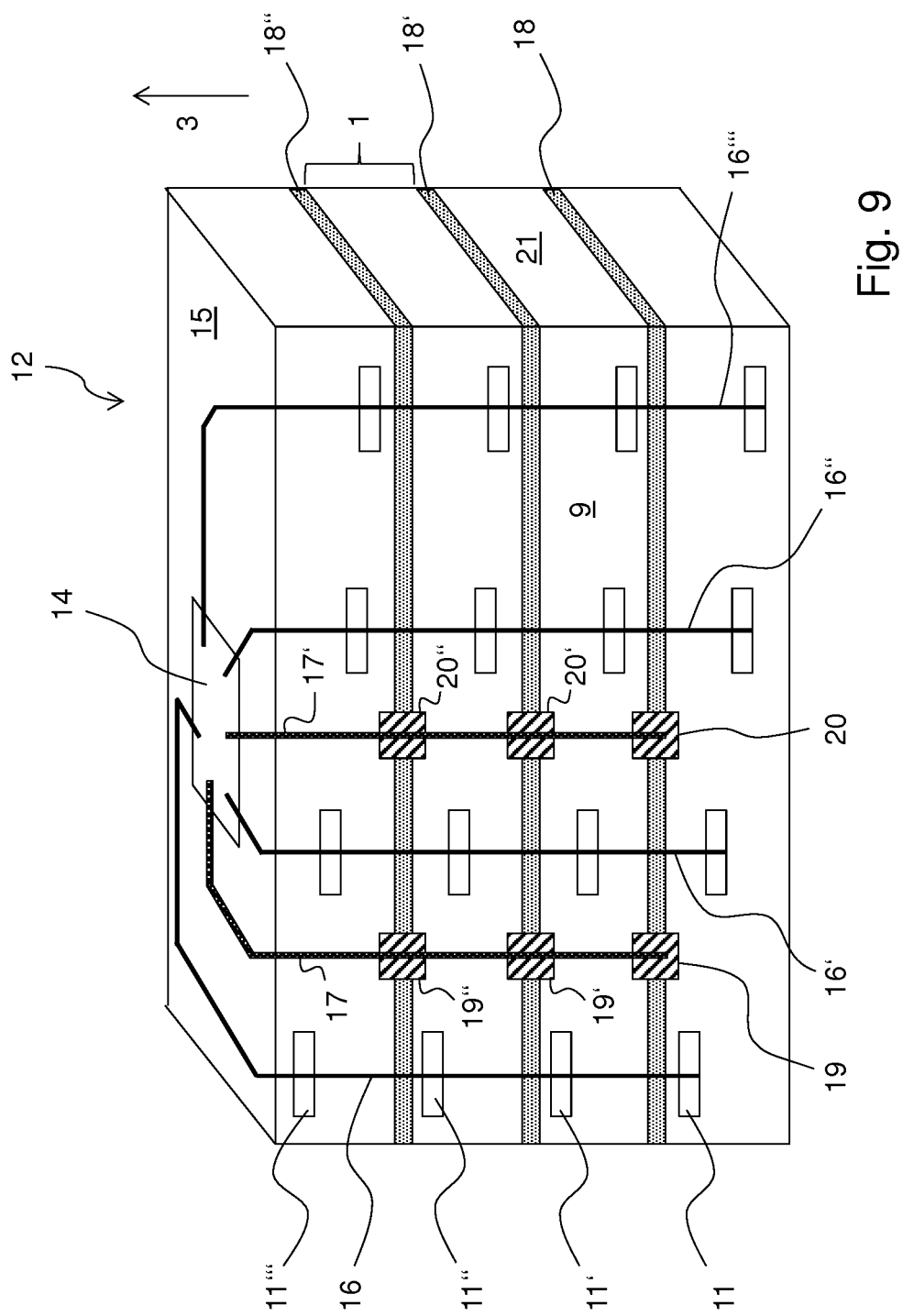
FIG. 9 shows a fourth example of an energy storage system.

FIG. 9 shows a fourth example of an energy storage system 12. In this illustration, a plurality of energy storage modules 1 are arranged one above another, wherein a temperature-regulating device 18, 18', 18" is arranged in each case therebetween. A more detailed illustration of the energy storage modules 1 has been dispensed with for the sake of improved clarity.

The energy storage modules 1 have in each case a plurality of contact lugs 11 on in each case the same side surface 9, the front side surface in this depiction, by means of which contact lugs the contact elements 8 of the energy storage modules 1 are led out. Furthermore, those contact lugs 11, 11', 11", 11' of different energy storage modules 1 that correspond to one another with regard to the construction of the energy storage modules 1 are arranged in such a way that these lie in a respective line, in particular in the stacking direction 3. These contact lugs 11 are electrically connected by means of a respective first parallel circuit 16, 16', 16", 16', wherein these first parallel circuits 16, 16', 16", 16' extend parallel to one another.

The temperature-regulating devices 18, 18', 18" each have first and second terminals 19, 19', 19'", 20, 20', 20", which are likewise arranged on the side surface 9 at which the contact lugs 11, 11', 11", 11' are arranged. The first and second terminals 19, 19', 19'", 20, 20', 20" of the temperature-regulating devices 18, 18', 18" are in each case electrically connected to one another and led out from the stack 2, such that the first and second terminals 19, 19', 19'", 20, 20', 20" in each case form a second parallel circuit 17, 17', wherein the second parallel circuits 17, 17' preferably extend parallel to one another. The temperature-regulating devices 18, 18', 18" preferably extend substantially parallel to the contact elements 8 of the energy storage modules 1. In particular, the temperature-regulating devices 18, 18', 18" are led in a meandering fashion.

The first and second parallel circuits 16, 16', 16", 17, 17' extend at least substantially parallel to one another, in particular at the front side surface 9, at which the contact lugs 11, 11', 11", 11' and the first and second terminals 19, 19', 19'", 20, 20', 20" are arranged.

The control device 14 is arranged on the upper end face 15 of the energy storage system 12, said control device being electrically connected to the first and second parallel circuits 16, 16', 16", 16', 17, 17'. By means of said control device 14, inter alia, the temperature-regulating devices 18, 18', 18" can be controlled and/or else supplied with electrical energy via the first and second terminals 19, 19', 19'", 20, 20', 20", connected via the second parallel circuits 17, 17'. Furthermore, the individual energy storage cells 4 of the energy storage modules 1 which correspond to one another in terms of their construction can be monitored.

LIST OF REFERENCE SIGNS

1 Energy storage module
2 Stack
3 Stacking direction
4 Energy storage cell
5 Anode layer
6 Cathode layer
7 Solid electrolyte
8 Contact element
9 (First) side surface
9' Second side surface
10 Contact pad
11, 11', 11", 11' Conductor lug or contact lug
12 Energy storage system
13 Arrow (joining together the energy storage modules)
14 Control device
15 End face
16, 16', 16", 16' First parallel circuit
17, 17' Second parallel circuit
18, 18', 18" Temperature-regulating device
19, 19', 19'" First terminal
20, 20', 20" Second terminal
21 Third side surface
21' Fourth side surface
22 First contact lug for current collectors
23 Second contact lug for current collectors The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An energy storage module configured for electrochemical storage of energy comprising:
    at least two energy storage cells arranged in a stack and connected in series, wherein each of the at least two energy storage cells has an anode layer and a cathode layer; and
    at least one contact element that is electrically connected to an anode layer of a first energy storage cell, said anode layer of the first energy storage cell being located within the stack, and to a cathode layer of a second energy storage cell adjacent to the first energy storage cell, said cathode layer of the second energy storage cell being located within the stack,
    wherein the at least one contact element is led out from the stack such that the at least one contact element is electrically contactable from outside the stack,
    wherein the at least one contact element has a contact pad extending substantially parallel to a side surface of the stack and perpendicular to said anode layer of the first energy storage cell and perpendicular to said cathode layer of the second energy storage cell, wherein said contact pad is electrically contactable from outside the stack.

2. The energy storage module according to claim 1, wherein the at least one contact element has a contact layer extending substantially parallel to the anode layer of the first energy storage cell and the cathode layer of the second energy storage cell, wherein said contact layer is electrically connected to the anode layer of the first energy storage cell and the cathode layer of the second energy storage cell.

3. The energy storage module according to claim 2, wherein the contact pad, along the side surface of the stack, has an extent that is greater than a thickness of the contact layer.

4. The energy storage module according to claim 1, wherein the contact pad is configured to form a plug connection with a contact pad of another energy storage module and/or an electrical line.

5. The energy storage module according claim 1, wherein a plurality of contact elements are led out from the side surface of the stack and respective contact pads are arranged offset in two dimensions of the side surface.

6. The energy storage module according to claim 5, wherein the contact pads of the contact elements are arranged substantially along a diagonal of the side surface of the stack.

7. The energy storage module according to claim 1, wherein the contact element has a contact lug extending away from a side surface of the stack.

8. The energy storage module according to claim 1, wherein the contact pad is spaced apart from the side surface and is electrically connected to the contact element by a contact lug.

9. The energy storage module according to claim 8, wherein the contact lug is formed integrally with the contact pad.

10. The energy storage module according to claim 7, further comprising an electronic control device arranged on an end face of the stack and electrically connected to the contact lug.

11. A vehicle comprising an energy storage module configured for electrochemical storage of energy, the energy storage module comprising:
    at least two energy storage cells arranged in a stack and connected in series, wherein each of the at least two energy storage cells has an anode layer and a cathode layer; and
    at least one contact element that is electrically connected to an anode layer of a first energy storage cell, said anode layer of the first energy storage cell being located within the stack, and to a cathode layer of a second energy storage cell adjacent to the first energy storage cell, said cathode layer of the second energy storage cell being located within the stack,
    wherein the at least one contact element is led out from the stack such that the at least one contact element is electrically contactable from outside the stack,
    wherein the at least one contact element has a contact pad extending substantially parallel to a side surface of the stack and perpendicular to said anode layer of the first energy storage cell and perpendicular to said cathode layer of the second energy storage cell, wherein said contact pad is electrically contactable from outside the stack.

* * * * *